United States Patent
Bretschneider

(10) Patent No.: US 12,443,163 B2
(45) Date of Patent: Oct. 14, 2025

(54) OPERATING METHOD FOR A MACHINE TOOL, COMPUTER PROGRAM PRODUCT, CONTROL UNIT AND MACHINE TOOL

(71) Applicant: Siemens Aktiengesellschaft, Munich (DE)

(72) Inventor: Jochen Bretschneider, Owingen (DE)

(73) Assignee: Siemens Aktiengesellschaft, Munich (DE)

( * ) Notice: Subject to any disclaimer, the term of this patent is extended or adjusted under 35 U.S.C. 154(b) by 389 days.

(21) Appl. No.: 18/020,343

(22) PCT Filed: Jul. 1, 2021

(86) PCT No.: PCT/EP2021/068115
§ 371 (c)(1),
(2) Date: Feb. 8, 2023

(87) PCT Pub. No.: WO2022/033761
PCT Pub. Date: Feb. 17, 2022

(65) Prior Publication Data
US 2023/0305522 A1    Sep. 28, 2023

(30) Foreign Application Priority Data
Aug. 10, 2020  (EP) .................................... 20190289

(51) Int. Cl.
*G05B 19/4093*  (2006.01)
*G05B 19/4061*  (2006.01)

(52) U.S. Cl.
CPC ... *G05B 19/40932* (2013.01); *G05B 19/4061* (2013.01); *G05B 19/40937* (2013.01);
(Continued)

(58) Field of Classification Search
None
See application file for complete search history.

(56) References Cited

U.S. PATENT DOCUMENTS

| 4,509,126 A | 4/1985 | Olig et al. |
| 2010/0292822 A1* | 11/2010 | Hahn .............. G05B 19/40937 700/98 |

(Continued)

FOREIGN PATENT DOCUMENTS

| CN | 104516313 A | 4/2015 |
| CN | 107132817 | 9/2017 |

(Continued)

OTHER PUBLICATIONS

PCT International Search Report dated Aug. 31, 2021 based on PCT/EP2021/068115 filed Jul. 1, 2021.

*Primary Examiner* — Ryan A Jarrett
(74) *Attorney, Agent, or Firm* — Cozen O'Connor

(57) ABSTRACT

A computer program product, a control unit, a machine tool and method for operating a machine tool includes providing a control command set for a tool, providing an actual contour of the workpiece, determining a first material entrance point of the tool into the workpiece and generating a first positioning command for an approach to the first material entrance point, wherein the first positioning command specifies a track path which differs from a track path specified by the control command set, where as an alternative, or additionally, a rapid movement of the tool and or clamping of the workpiece is specified by the first positioning command.

16 Claims, 4 Drawing Sheets

(52) U.S. Cl.
    CPC ........... *G05B 2219/43031* (2013.01); *G05B 2219/49365* (2013.01)

(56) References Cited

U.S. PATENT DOCUMENTS

| | | |
|---|---|---|
| 2015/0094848 A1 | 4/2015 | Bretschneider et al. |
| 2017/0248934 A1 | 8/2017 | Fujiyama |
| 2017/0269571 A1 | 9/2017 | Pitz et al. |
| 2018/0207799 A1 | 7/2018 | Bretschneider et al. |
| 2018/0239337 A1 | 8/2018 | Hamm et al. |
| 2018/0293340 A1 | 10/2018 | Kawashima |
| 2019/0317474 A1 | 10/2019 | Miyazaki |

FOREIGN PATENT DOCUMENTS

| | | |
|---|---|---|
| CN | 107850885 | 3/2018 |
| CN | 108027605 | 5/2018 |
| CN | 110376961 | 10/2019 |
| CN | 210968111 | 7/2020 |
| DE | 3348159 C2 | 12/1992 |
| DE | 102018002660 | 10/2018 |
| EP | 2853354 | 4/2015 |
| EP | 3220223 | 9/2017 |
| EP | 3309635 | 4/2018 |
| JP | S63200944 | 8/1988 |
| JP | H10293606 | 11/1998 |
| JP | 2001092513 | 4/2001 |
| TW | 200908183 | 2/2009 |

\* cited by examiner

OPERATING METHOD FOR A MACHINE TOOL, COMPUTER PROGRAM PRODUCT, CONTROL UNIT AND MACHINE TOOL

CROSS-REFERENCE TO RELATED APPLICATIONS

This is a U.S. national stage of application No. PCT/EP2021/068115 1 Jul. 2021. Priority is claimed on European Application No. 20190289.7 filed 10 Aug. 2020, the content of which is incorporated herein by reference in its entirety.

BACKGROUND OF THE INVENTION

1. Field of the Invention

The invention relates to a control unit, a machine tool including the control unit and a method for operating a machine tool and a computer program product for performing the method.

2. Description of the Related Art

Published unexamined patent application DE 10 2018 002 660 A1 discloses an information processor that is designed to simulate a movement of a tool based on a machining program. The information processor is provided with an air cut path determination unit, via air cuts can be identified during machining of a workpiece.

DE 33 48 159 C2 discloses a control system for a machine tool that is designed to approach a workpiece with a tool at an increased traverse speed. Contact with the workpiece is detected by identifying a rise in the power draw of a drive. If contact with the workpiece is detected, then a reduction in the traverse speed is specified.

During automated machining of workpieces, the aim is for the machining to be performed rapidly, with low wear, and cost-efficiently. In particular, in the case of machine tools, such as multi-axis milling, the objective is to reduce the number of non-productive movements of the machine, known as auxiliary process time movements. At the same time, precise and reliable machining of the workpiece is required.

SUMMARY OF THE INVENTION

In view of the foregoing, it is an object of the invention to provide a facility that offers an improvement in at least one of the above-outlined requirements.

These and other objects and advantages are achieved in accordance with the invention by a method for operating a machine tool which is configured to machine a workpiece. To this end, the machine tool comprises at least one tool that can be moved by at least one drive means to perform machining on the workpiece. The tool can be moved by control commands that may be part of a control command set. In a first step, a control command set is provided for the tool. The control command set comprises a plurality of control commands that can be issued and implemented in a sequence, so that the tool can travel along a track path. The control command set is established such that, in the course of machining, the workpiece the latter is cut to a desired contour. A second step entails the providing an actual contour of the workpiece. Here, the actual contour can map the entire workpiece or at least one area that is to be machined by the machine tool. The actual contour of the workpiece is provided here as data that can, for example, be evaluated by a control unit of the machine tool in combination with the control command set. The method further comprises a third step, in which a first material entrance point of the tool into the workpiece is calculated based on the actual contour of the workpiece. Here, a material entrance point means a position at which, during an operational sequence, i.e., a sequential execution, of the control command set, the tool comes into contact with the workpiece and starts machining of the workpiece. To determine the first material entrance point, a calculation is made, for example, by a simulation, which is based on the actual contour of the workpiece and the control command set. From the determination of the first material entrance point, a section on a track path specified by the control command set that is free from machining emerges in a complementary manner. Such sections are also referred to as air cuts. A fourth step follows, in which, for example, a first positioning command is automatically calculated by the control unit, via which the first material entrance point is approached with the tool.

In accordance with the invention, a track path is specified by the first positioning command for the tool, in particular its tool reference point, where the track path differs from a track path originally specified by the control command set. The first positioning command is established to dominate over the control command set and at least partially to replace the control command set in the operational sequence. The first positioning command thus inserts a shortcut into the track path specified in the control command set. This enables a length of an air cut of the tool to be reduced and thus speed up the machining of the workpiece. Alternatively or additionally, a rapid movement of the tool and/or clamping of the workpiece can be specified by the first positioning command. A rapid movement means a movement of the tool that exceeds a feed rate at which a workpiece can be machined. With the rapid movement, time is saved in reaching the first material entrance point and the machining time of the workpiece is reduced. The approach to the first material entrance point on a different track path, which serves as a shortcut, and the approach in the form of a rapid movement can be combined, as a result of which a greater time saving is achieved. The first material entrance point is, in this case, approached at the velocity and with the rotational speed of the tool that would have arisen during the execution of the original control command set. The inventive method manages without additional sensors and hence can be implemented in a simple and cost-efficient manner. Further, the method can be programmed by the user via the control command set, in other words, for example, by switching on or off or specifying a work mode. The detection of the actual contour can be performed rapidly and precisely in a production environment independently of the control unit. The control unit in this case merely accepts the results of this detection.

Alternatively, the detection of the actual contour can be integrated into the control unit. The method integrated into the control unit is thus suitable for using future improvements in the detection of actual contours of workpieces, for example, in the case of a 3D scanner or computer-aided image processing. Overall, the inventive method offers a reduction in machining time when machining workpieces and helps increase economic efficiency.

In one f embodiment of the method, the actual contour of the workpiece is provided by detecting the workpiece. The detection is, for example, performed via a 3D scanner and/or a camera that is connected to an image evaluation unit. Alternatively or additionally, the actual contour can be detected with a laser measuring device, an ultrasound sensor or an X-ray device. The method in accordance with the disclosed embodiments can consequently be integrated into a plurality of existing production chains containing various devices that are suitable for detecting the actual contour of the workpiece. Consequently, the method in accordance with the disclosed embodiments has a high degree of flexibility.

Furthermore, in the above-described third step of the method, in which the first material entrance point is determined, can be performed via a collision avoidance unit of the machine tool. The collision avoidance unit can to this end, for example, be formed as a software module that is configured to identify impending collisions between objects, for example, the tool and stationary objects such as the workpiece or the surrounding area. Such collision avoidance units are, in any event, present in a multiplicity of machine tools and make it possible to reliably and accurately forecast an impending collision of the tool or of machine components. The collision avoidance unit to this end has data describing the shape, size and position of the tool as well as the relevant machine bodies, such as machine axes, spindles, covers, machine bench, and workpiece clamping systems.

If the collision avoidance device is used to calculate a first material entrance point, then the data on the actual contour of the workpiece is provided to the collision avoidance unit. The method in accordance with the disclosed embodiments hence utilizes components that are already present in machine tools, and can therefore be implemented cost-efficiently and rapidly. Furthermore, collision avoidance units are typically configured such that, when an unexpected collision is identified, the movement of the tool and/or clamping of the workpiece can be safely stopped. The use of the collision avoidance unit makes the inventive method even more efficient overall, because abbreviated tool paths automatically calculated by the control unit can be checked to ensure they are collision-free.

Furthermore, the method in accordance with the disclosed embodiments can contain further steps, via which the above-outlined technical advantages can be further exploited. A fifth step can entail the determining a first material exit point. The first material exit point, corresponding to the first material entry point, means that the tool loses contact with the workpiece and what is known as an air cut occurs again. In the fifth step, a second material entrance point is also determined, which follows on from the first material exit point during a movement of the tool in accordance with the control command set. In the second material entrance point, the tool again comes into contact with the workpiece following what is known as an air cut. A sixth step follows, in which a second positioning command is generated. The second positioning command is established to move the tool substantially from the first material exit point to the second material entrance point. The second positioning command can in this case be established, analogously to the first positioning command, to specify a track path for the tool that differs from the track path specified by the control command set. Alternatively or additionally, the second positioning command can also be established to specify a rapid movement of the tool, in particular for the movement from the first material exit point to the second material entrance point.

Corresponding to the first positioning command, the operating principle of the latter can be transferred to further air cuts which may occur during the machining of the workpiece. As a result, a time saving is achieved not only at the start of machining the workpiece, but also during machining. The fifth and sixth steps can analogously also be applied to further material entrance points that are to be approached during machining of the workpiece. Accordingly, the fifth and sixth steps, as a function of the workpiece, can be repeated as often as desired. The technical advantages of the method in accordance with the disclosed embodiments are thus further increased.

In a further embodiment of the method, the control command set can be established for the production of a desired manufactured part based on a maximum contour of a workpiece blank, i.e., a workpiece in an initial state with a maximum oversize. The maximum contour represents the largest existing permissible or expected size of the workpiece blank for machining. Consequently, the workpiece blank represents a starting point for machining the workpiece. Accordingly, the track path specified by the control command set for the tool begins outside the maximum contour and ensures that the method in accordance with the disclosed embodiments starts collision-free. Consequently, the control command set has a section in its specified track path which, in the case of a workpiece blank that is smaller than the maximum contour, can be eliminated by the first positioning command and/or can be traversed with a rapid movement. A maximum contour such as this can, for example, be readily derived from design data for the workpiece, in particular CAD data, such as by the addition of a maximum permitted oversize. Consequently, the method in accordance with the disclosed embodiments can be reliably performed.

Further, the actual contour of the workpiece can be repeatedly detected during the machining of the workpiece, so that the removal of material from the workpiece caused by the tool is identified. This allows the shape or present contour of the workpiece to be identified currently during the machining and for a repeated performance of the method in accordance with the disclosed embodiments to be taken into consideration. For example, machining of the workpiece in a first area can result in a change to the actual contour, which in the further machining with the control command set results in a further air cut, which can likewise be shortened using the claimed method. The detection can in this case occur analogously to the detection in the second step. Alternatively or additionally, the actual contour can also be detected, because the machining, and the associated removal of material from the workpiece, are simulated, for example, by the control unit. Numerous currently available control units readily enable the removal of material from the workpiece to be reliably simulated. The method in accordance with the disclosed embodiments is therefore suitable for a dynamic machining situation. Accordingly, the method in accordance with the disclosed embodiments is suitable for being performed automatically in any machining situation that is suitable for this. As a result, the advantages of the method are achieved to a particular extent.

In a further embodiment of the method, the first and/or second material entrance point can be approached with an adjustable safety clearance. The safety clearance is used to approach the original track path at a defined distance from the workpiece and above all to produce the velocity and rotational speed of the cutting process required for machining with the tool prior to entry into the material, i.e., into the workpiece. Thus, damage caused by an inactive, i.e., non-rotating, tool hitting the workpiece can be avoided, or also, for example, a start-up of a milling cutter in contact with the workpiece. The safety clearance can, for example, be set via a user input, a type-specific fixed specification, or can be specified by way of an automatic calculation by the control unit of the machine tool. As a result, the method in accordance with the disclosed embodiments has a wide range of applications.

In addition, the method in accordance with the disclosed embodiments can take into consideration a position and/or alignment of the workpiece in the third step, in which the first material entrance point is determined, and/or in the fourth step, in which the first positioning command is generated. For example, just one area of the actual contour may be included in the performance of the third and/or fourth steps, where the area is accessible for the tool or is to undergo machining. As a result, the computing time can be reduced and simultaneously a precise performance of the method in accordance with the disclosed embodiments is possible.

In a further embodiment of the method, the method can be performed in real time. To this end, the method is integrated into a production process and thus avoids additional downtime of the tool. In particular, the method can be performed to generate the first positioning command and immediately thereafter on the basis thereof the first material entrance point can be approached. During this or on reaching the first material exit point, the method taking place in real time is then performed, in order to determine the second positioning command for the approach to the second material entrance point. Additionally the workpiece, i.e., its actual contour, can be detected between reaching the first material entrance point and reaching the first material exit point at least once in accordance with the second step.

Furthermore, the track path specified for the tool by the first and/or second positioning command can be checked by the collision avoidance unit of the machine tool. If it is established that the respective track path is collision-free, then it is traversed by the tool. If not, the first and/or second positioning command is suppressed and instead travel along a track path is initiated that corresponds to the control command set. Alternatively or additionally, for example, a collision-free first and/or second positioning command can be determined by the control unit based on the actual contour of the workpiece. The first and/or second positioning command can bring about a track path of any shape that is not limited to rectilinear elements. As a result, the safety of the inventive method is increased in a simple manner by the use of an existing component, i.e., the collision avoidance unit.

In a further embodiment of the method, the second step, in which the actual contour of the workpiece is detected, occurs in a state clamped in the machine tool. In the clamped state, the position and/or alignment of the workpiece can in particular be detected, and accordingly the first material entrance point can be approached exactly. Alternatively or additionally, the actual contour of the workpiece can be detected outside the machine tool. This permits the use of structurally large and powerful detection device, such as 3D scanners, laser sensor devices, X-ray devices, and/or computed tomography systems. The inventive method can accordingly be implemented precisely. The detection of actual contours of workpieces is part of different production processes, so that the inventive method can be implemented in numerous applications without increased effort. The concept of digital production is realized more consistently in this way.

Further, in the method the control command set, the first and/or second positioning command can be formed as G-code. G-code is a standardized coding for controlling machine tools, which can be employed virtually universally on all machine tools. G-code can be executed directly without further interpretation effort and saves storage space. Consequently, the inventive method can also be implemented on existing machine tools with reduced computing power, which in turn offers a wide potential range of applications. The positioning command is automatically calculated by the control unit and the result of the calculation can be executed as G-code. Alternatively, the result of the calculation can be calculated directly by the control unit internally without recourse to G-code.

In a further embodiment, the first and/or second positioning command can be established such that they can be converted directly by the control unit into travel movements of the tool. When generating the first and/or second positioning command, higher codings, such as G-code, are avoided. As a result, the computing effort required is reduced, which in turn simplifies the performance of the method in real time. A corresponding interpreter, for example, a G-code interpreter, is likewise unnecessary.

The objects and advantages in accordance with the invention are also achieved by a computer program product which is configured to issue control commands to a machine tool. The computer program product has a data interface, via which the data on an actual contour of a workpiece can be received. The data on the actual contour of the workpiece can be processed in combination with a control command set. In particular, the computer program product is suitable for calculating and/or simulating a movement of a tool of the machine tool which can be caused by the control command set. The computer program product is inventively configured to implement at least one form of embodiment of the methods outlined above and thus to control machining of the workpiece. The computer program product can be fully implemented in software, or can be formed to be hardwired, for example as a chip, integrated circuit, microcontroller, FPGA or similar. Likewise, the computer program product can also be designed as a combination of software and a hardwired form. The computer program product can further be established to be monolithic, i.e., to include all functionally essential components. Alternatively, the computer program product can be configured to be modular, i.e., composed of subprograms that can be executed on different hardware platforms and in communicative data connection with one another can provide the functionality underlying the invention. For example, the computer program product can include a subprogram that provides at least one function on a central computer or a computer cloud. Likewise, the computer program product can be configured as part of a simulation environment of the machine tool, thus for example as what is known as a digital twin.

It likewise also an object of the invention to provide a control unit for a machine tool. The control unit comprises a computing unit and a storage unit, which are configured to execute a computer program product, where control commands for the machine tool can be generated by processing, i.e., interpretation, of the control command set. The control command set can be provided by a user, for example, as an NC program. The control unit is inventively configured to implement at least one embodiment of the method in accordance with the disclosed embodiments. To this end, the control unit can, for example, be fitted with an embodiment of the disclosed inventive computer program product.

The object of the invention in accordance with the disclosed embodiments is also achieved by an inventive machine tool that comprises a tool that is suitable for machining a workpiece. The tool is moved by at least one driver that can be controlled by control commands generated by a control unit. The control unit is inventively configured in accordance with the above disclosed embodiments in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below in figures, using individual forms of embodiment. The figures are to be read as mutually complementary, so that the same reference characters have the same technical meaning in different figures. The features of the individual forms of embodiment can also be combined with one another. Further, the forms of embodiments shown in the figures can be combined with the features outlined above, in which.

DETAILED DESCRIPTION OF THE EXEMPLARY EMBODIMENTS

Figure 1:
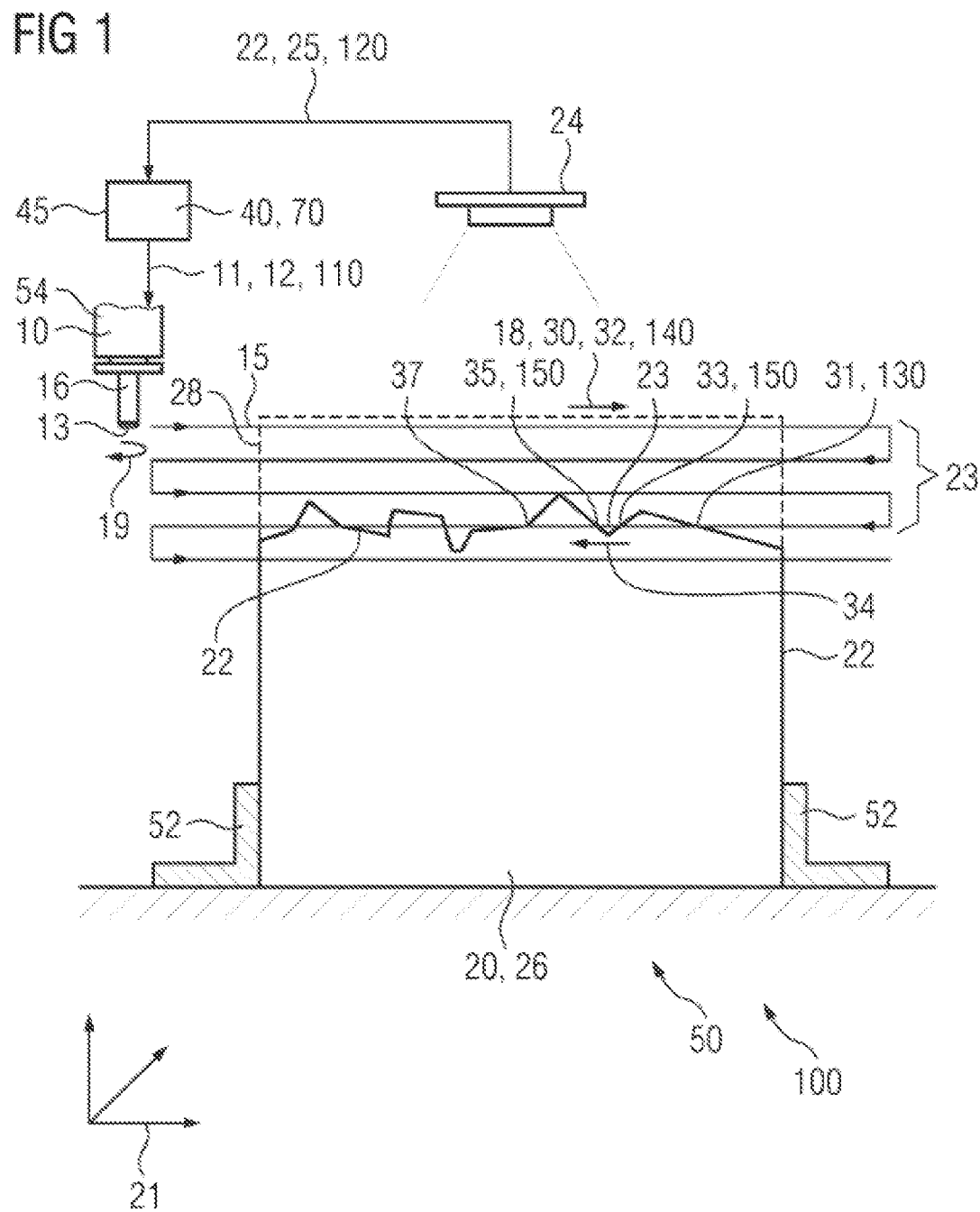
FIG. 1 shows a first embodiment of the method in accordance with the invention.

FIG. 1 schematically shows a first embodiment of the inventive method 100 that is implemented in a machine tool 50, which is not shown in greater detail for purposes of clarity. A workpiece 20 is clamped in a clamp 52 of the machine tool 50 and is initially present as a blank 26 and is to be machined via a tool 10. The machine tool 50 has a control unit 40 which is configured to issue control commands 11 to driver 54 of the machine tool 50 that are part of a control command set 12, by which the desired machining of the workpiece 20 is defined. With a control command set 12, a track path 15 for the machining of the workpiece 20 can be specified, via which the machining is specified. In a first step 110 of the method 100, the control command set 12 is provided. A second step 120, which can be performed prior to, during or after the first step 110, entails the detection of an actual contour 22 of the workpiece 20 by a detector 24, which is formed as a 3D scanner. The actual contour 22 is represented by data 25 that is generated by the detector 24 and transferred to the control unit 40. In a third step 130, the actual contour 22 and the control command set 12 are evaluated by the control unit 40 in the form of a calculation, such as a simulation. Travel along the track path 15 is simulated, which is specified by the control command set 12 and, in this case, determines a first collision between the tool 10 and the workpiece 20. The calculation in this case relates to a reference point 13 of the tool 10. Likewise, a position and alignment of the workpiece 20 is taken into consideration, which is symbolized in FIG. 1 by the coordinate plane 21. The location of the first collision thus determined represents the first material entrance point 31 that is, in this way, determined in the third step 130. To this end, use is made of a collision avoidance unit 45 of the control unit 40.

A subsequent fourth step 140 entails the determination, generation and issue of a positioning command 30, which is dominant compared to the specification of the control command set 12. In detail, a first positioning command 32 is generated in the fourth step 140, via which the tool 10 travels further along the track path 15 specified by the control command set 12. In addition, a rapid movement 18 for the tool 10 is specified by the first positioning command 32. In the rapid movement 18, the tool 10 has an increased velocity compared to machining. Here, rapid movement 18 is performed until the first material entrance point 31 is reached. During the rapid movement 18 or on reaching the first material entrance point 31, a rotational movement 19 of the tool 10, which is formed as a milling cutter 16, can be initiated. In this case, at the start of the cutting operation, the cutting conditions specified in the original control command set are produced. The control command set 12 is specified so that a maximum contour 28 is permissible for the workpiece 20 which, however, is not reached by the actual contour 22, as shown in FIG. 1. Accordingly, one section of the track path 15 is formed by the control command set 12 as an air cut 23. The first positioning command 32 generated in the fourth step 140 thus allows the tool 10 to move at an increased speed in the area of the air cut 23 and to save time when approaching the first material entrance point 31. Increasing the velocity of the tool 10 requires only a minimal intervention in the control sequence of the control unit 40 and can therefore be implemented with minimal computing effort.

In the further operational sequence of the method 100, a fifth step 150 entails determining a first material exit point 33 which, during the travel along the track path 15, follows on from the first material entrance point 31. Likewise, in the fifth step 150, a second material entrance point 35 is determined. An air cut 23 is situated between the first material exit point 33 and the second material entrance point 35, and is also determined in this way. A sixth step 160 follows, in which a second positioning command 34 is generated. With the second positioning command 34, the second material exit point 35 is approached with the tool 10 starting from the first material exit point 33. Analogously to the first positioning command 32, a rapid movement 18 of the tool 10 is specified via the second positioning command 34. The air cut 23, which is situated between the first material exit point 33 and the second material entrance point 35, is thus also performed in a time-saving manner. The fifth and sixth step 150, 160 can be repeated analogously further on in the method 100 for further air cuts 23 during the machining of the workpiece 20. Likewise, the track paths 15 which, via the first and/or second positioning command 32, 34, can be checked by the collision avoidance unit 45 for freedom from collisions. The method 100 is implemented overall by a computer program product 70 that is stored in an executable manner on the control unit 40.

Figure 2:
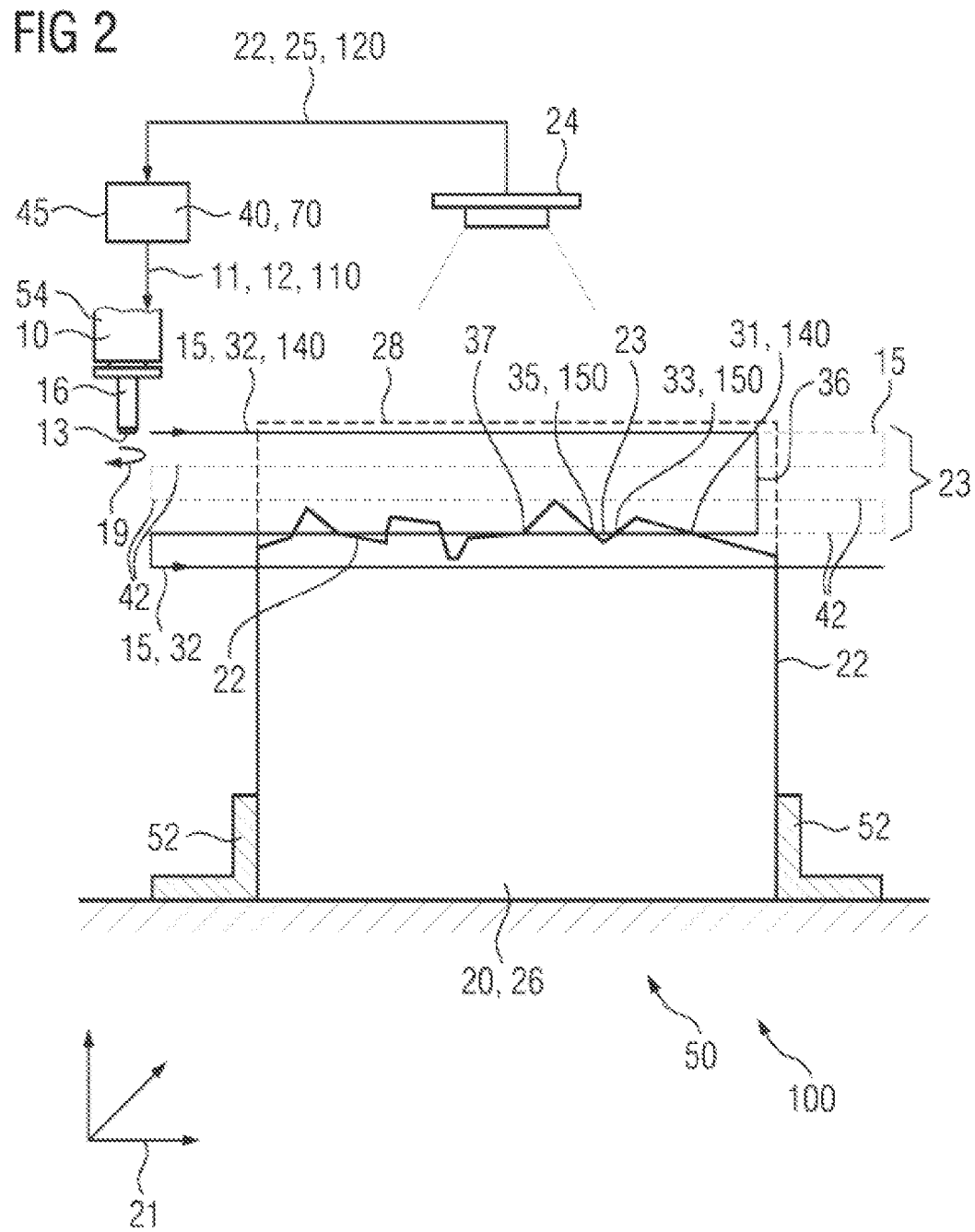
FIG. 2 shows a second embodiment of the method in accordance with the invention.

FIG. 2 schematically represents a second embodiment of the inventive method 100, which is implemented in a machine tool 50 (not shown in greater detail) and is combined with the method 100 of FIG. 1. A workpiece 20, which is initially present as a blank 26 and is to be machined using a tool 10, is clamped in a clamp 52 of the machine tool 50. The machine tool 50 has a control unit 40 that is configured to issue control commands 11 that can be part of a control command set 12, via which the desired machining of the workpiece 20 is defined. With a control command set 12 a track path 15 via which machining is specified can be specified for machining the workpiece 20. In a first step 110 of the method 100, the control command set 12 is provided. In a second step 120, which can be performed prior to, during or after the first step 110, an actual contour 22 of the workpiece 20 is detected by a detector 24, which is formed as a 3D scanner. The actual contour 22 is represented by data 25 that is generated by the detector 24 and is transferred to the control unit 40. In a third step 130, the actual contour 22 and the control command set 12 are evaluated by the control unit 40 in the form of a calculation, such as a simulation. Travel along the track path 15 is simulated, where the track path 15 is specified by the control command set 12 and, in this case, determines a first collision between the tool 10 and the workpiece 20. To this end, a collision avoidance unit 45 of the control unit 40 is employed. The calculation of the first material entrance point 31 is in this case related to a reference point 13 of the tool 10. Likewise, a position and alignment of the workpiece 20 is considered, this being symbolized in FIG. 2 by the coordinate plane 21. The location of the first collision determined in this way represents the first material entrance point 31 that is determined in this way in the third step 130.

A subsequent fourth step 140 entails the determination, generation and issue of a positioning command 30, which is dominant compared to the specification of the control command set 12. In detail, a first positioning command 32 is generated in the fourth step 140, via which the tool 10 deviates from the track path 15 specified by the control command set 12. With the first positioning command 32, a track path 15 is specified that leaves the original track path 15 to take a shortcut. Thus, via the first positioning command 32, a track path 15 is specified that has an abbreviated traverse section 36, and thus forms a shortcut for the tool 10. Analogously to FIG. 1, a rapid movement 18 can optionally be specified for the tool 10 by the first positioning command 32. With the first positioning command 32, travel along the traverse section 36 can be specified for the tool 10, resulting in a time saving when approaching the first material entrance point 31. When traveling along the track path 15 specified by the first positioning command 32 or on reaching the first material entrance point 31, a rotational movement 19 of the tool 10, which is formed as a milling cutter 16, can be initiated. The control command set 12 is established so that for the workpiece 20 a maximum contour 28 is permissible, which however is not reached by the actual contour 22, as shown in FIG. 1. Accordingly, a section of the track path 15 is formed by the control command set 12 as an air cut 23. The first positioning command 32 generated in the fourth step 140 thus in the region of the air cut 23 allows the tool 10 to move along the traverse section 36, i.e., taking an abbreviated path, and thus saving time when approaching the first material entrance point 31. The track path 15 specified by the first positioning command 32 has a reduced number of turning points 42 and/or a shorter track path, and is calculated and provided simultaneously by the control unit at the time of processing the control command set 12, i.e., in real time.

In the further operational sequence of the method 100, a fifth step 150 entails the determination of a first material exit point 33 which, during travel along track path 15, follows on from the first material entrance point 31. Likewise, in the fifth step 150 a second material entrance point 35 is determined. An air cut 23 is situated between the first material exit point 33 and the second material entrance point 35, and is also determined in this way. A sixth step 160 follows, in which a second positioning command 34 is generated. With the second positioning command 34, the second material exit point 35 is approached with the tool 10 starting from the first material exit point 33. Analogously to the first positioning command 32, With the second positioning command 34, a rapid movement 18 of the tool 10 is specified. The air cut 23, which is situated between the first material exit point 33 and the second material entrance point 35, is also performed in a time-saving manner in this way. The fifth and sixth step 150, 160 can be repeated analogously further on in the method 100 for further air cuts 23 during the machining of the workpiece 20. Likewise, the track paths 15, which via the first and/or second positioning command 32, 34 can be checked by the collision avoidance unit 45 for freedom from collisions. The method 100 is implemented overall by a computer program product 70 that is stored in an executable manner on the control unit 40.

Figure 3:
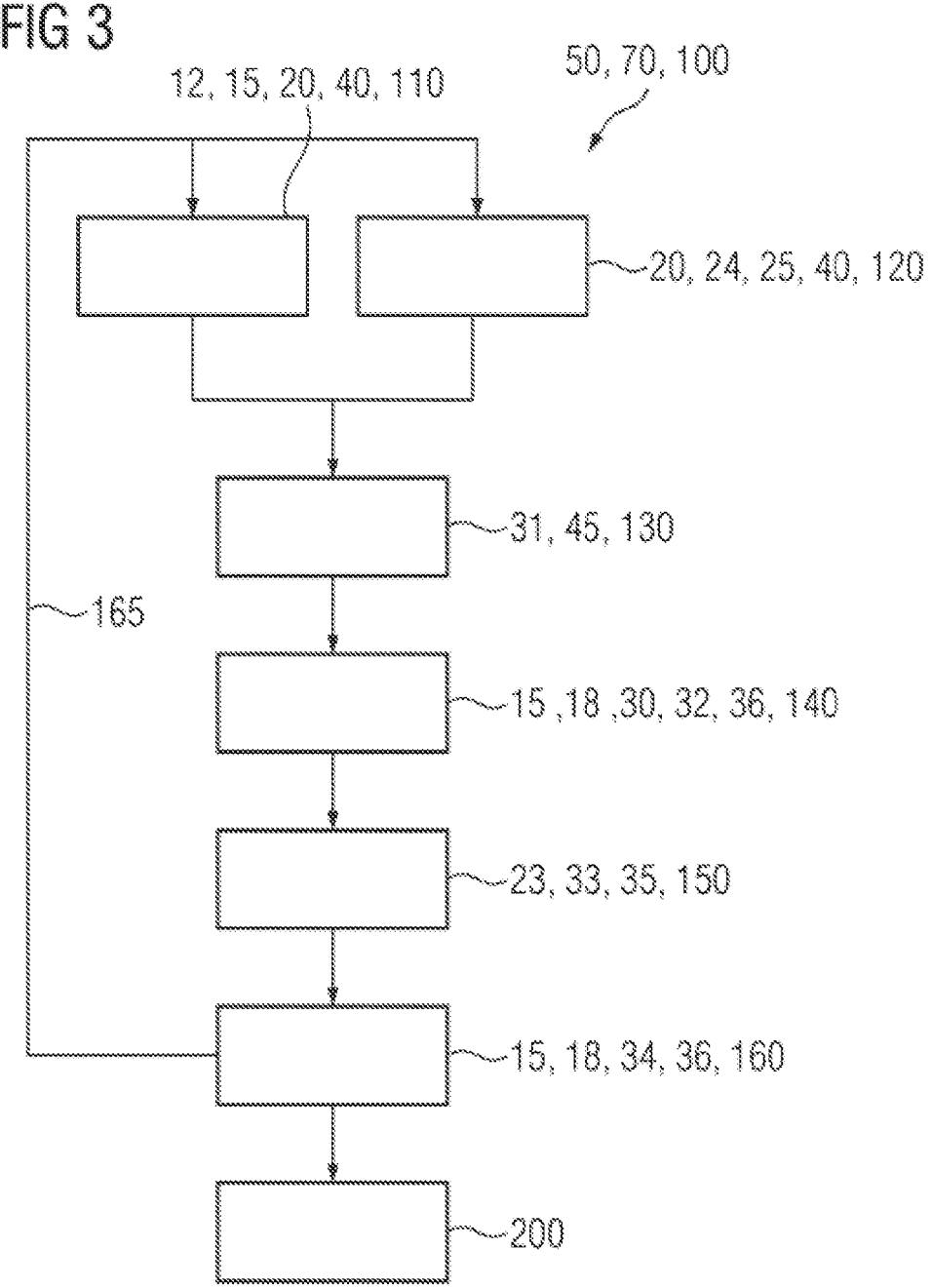
FIG. 3 schematically shows an operational sequence of a third embodiment of the method in accordance with the invention.

An operational sequence of a third embodiment of the inventive method 100 is shown schematically in FIG. 3. The method 100 is performed for a machine tool 50 (not shown in greater detail).

The method 100 comprises a first and a second step 110, 120, which are substantially performed simultaneously. The first step 110 entails providing a control command set 12, via which a track path 15 for a desired machining of a workpiece 20 can be specified. Here, the control command set 12 is provided in a control unit 40 of the machine tool 50. The second step 120 entails the detection of an actual contour 22 of the workpiece 20, which is provided as data 25. The actual contour 22 or the corresponding data 25 is in this case also provided in the control unit 40.

A third step 130 follows, in which a collision avoidance unit 45 is employed, in order to determine a first material entrance point 31 based on the actual contour 22 of the workpiece 20 and the control command set 12. The first material entrance point 31 represents the position at which a tool 10, with which the machining of the workpiece 20 is to be performed, first comes into contact with the workpiece 20 during its travel along the track path 15 specified by the control command set 12. A fourth step 140 follows, in which a positioning command 30 is generated, which is dominant compared to the control command set 12, and therefore can at least partially replace it. A first positioning command 32 is generated, via which a rapid movement 18 is specified for the tool 10 for the approach to the first material entrance point 31. Further, the first positioning command 32 is established such that the track path 15 specified by it of the tool 10 differs from the track path 15 specified by the control command set 12. An abbreviated track path 15 with a traverse section 36 is specified by the first positioning command 32, and represents a shortcut for the tool 10. Accordingly, an abbreviated path and an increased velocity is specified for the tool 10 with the first positioning command 32 until the first material entrance point 31 is reached and thus a time saving is achieved.

A fifth step 150 follows, in which a first material exit point 33 is determined for the tool 10. Likewise, in the fifth step 150 a second material entrance point 35 is determined for the tool 10. This results in an air cut 23 between the first material exit point 31 and the second material entrance point 33. A subsequent sixth step 160 entails determining and generating a second positioning command 34, via which a track path 15 is specified for the tool 10, with which the air cut 23 between the first material exit point 33 and the second material entrance point 35 is to be performed. With the second positioning command 34, a rapid movement 18 of the tool 10 is specified analogously to the first positioning command 32 in the fourth step 140. Equally analogously to the first positioning command 32, via the second positioning command 34 a track path 15 is specified for the tool 10 that differs from the track path 15 specified by the control command set 12. The track path 15 specified by the second positioning command 34 comprises a traverse section 36 that represents a shortcut for the tool 10. Accordingly, with the second positioning command 34 it is also possible to speed up the machining of the workpiece 20 that is to be performed.

The steps 110, 120, 130, 140, 150, 160 can be repeatably performed via a return loop 165, so that the technical advantages achieved therewith can be implemented for further areas of the workpiece 20. In a subsequent seventh step 170, the machining of the workpiece 20 is initiated by the tool 10 on the machine tool 50. The method 100 is realized via a computer program product 70 on a control unit 40 of the machine tool 50. Following performance of the sixth step 160, the method 100 reaches a final state 200.

Figure 4:
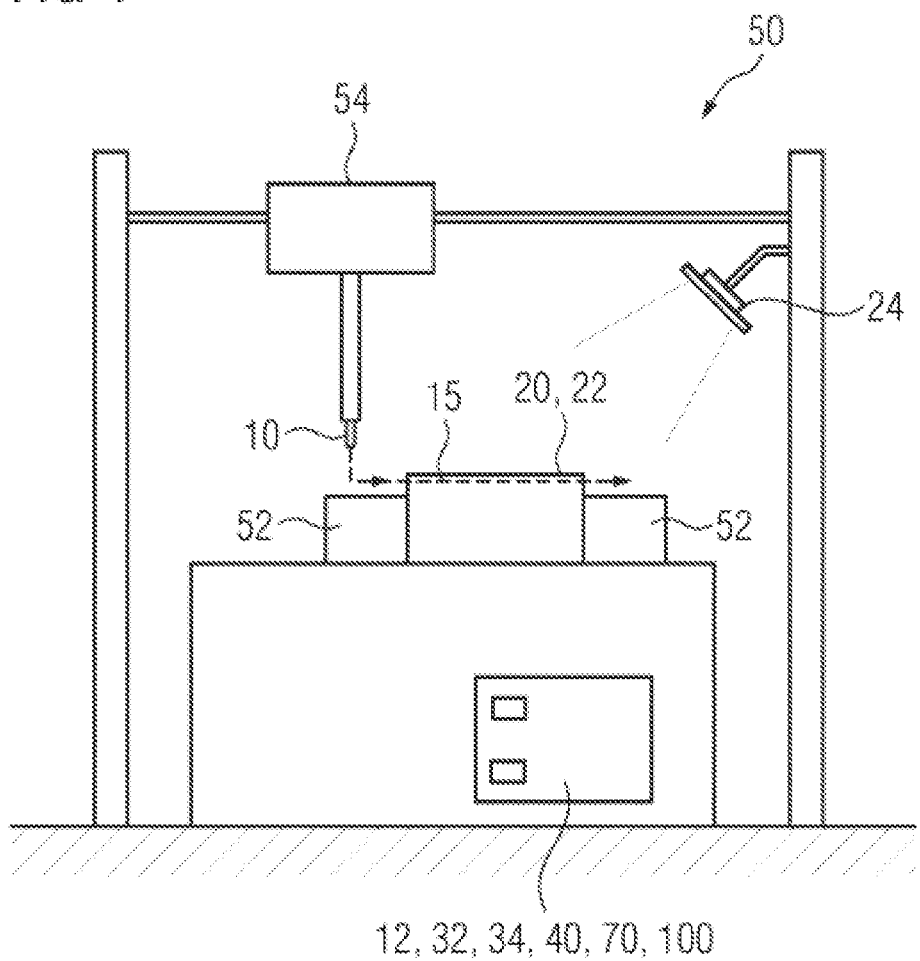
FIG. 4 shows the structure of an embodiment of the machine tool in accordance with the invention.

FIG. 4 schematically shows the structure of an embodiment of the machine tool 50 that comprises a tool 10 with which a workpiece 20 can be machined. The tool 10 can be moved by a driver 54. The workpiece 20 is releasably clamped in a clamp 52 of the machine tool 50. Further, the workpiece 20 can be machined by the tool 10 when traveling along a track path 15 that can be specified by a control command set 15, a first and/or second positioning command 32, 34. The control command set 12, the first and/or second positioning command 32, 34 can be specified by a computer program product 70 that can be executed on a control unit 40 of the machine tool 50. The control unit 40 has a computing unit 43 and a storage unit 44 and is configured to implement at least one embodiment of the method 100 in accordance with the disclosed embodiments. To this end, the machine tool 50 is provided with a detector 24, via which an actual contour 22 of the workpiece 20 can be detected.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a machine tool, comprising:
   a) providing a control command set via which a desired machining of a workpiece is defined;
   b) providing an actual contour of the workpiece;
   c) calculating a first material entrance point of a tool into the workpiece based on the actual contour of the workpiece; and
   d) generating a first positioning command for an approach to the first material entrance point;
   wherein the first positioning command specifies a track path which differs from a track path specified by the control command set;
   wherein said calculating is performed via a collision avoidance unit of the machine tool;
   wherein the track path has an abbreviated traverse section and the actual contour of the workpiece is produced by detection of the workpiece;
   wherein the first positioning command generated during said generating is dominant in comparison to a specification of the control command set; and
   wherein the method is performed in real-time.

2. The method as claimed in claim 1, further comprising:
   e) determining a first material exit point and a second material entrance point;
   f) generating a second positioning command for an approach to the second material entrance point starting from the first material exit point.

3. The method as claimed in claim 2, wherein the control command set is formed based on a maximum contour of the workpiece.

4. The method as claimed in claim 2, wherein the actual contour of the workpiece is repeatedly detected during machining.

5. The method as claimed in claim 2, wherein the track path specified by at least one of the first and second positioning command is checked by the collision avoidance unit of the machine tool.

6. The method as claimed in claim 1, wherein the control command set is formed based on a maximum contour of the workpiece.

7. The method as claimed in claim 6, wherein the actual contour of the workpiece is repeatedly detected during machining.

8. The method as claimed in claim 1, wherein the actual contour of the workpiece is repeatedly detected during machining.

9. The method as claimed in claim 1, wherein at least one of the first and second material entrance point is approached directly or with an adjustable safety clearance.

10. The method as claimed in claim 1, wherein the actual contour of the workpiece is detected in a state in which said workpiece is at least one of clamped in the machine tool and detected outside the machine tool.

11. The method as claimed in claim 1, wherein the control command set, the first and the second positioning command are formed as G-code.

12. The method as claimed in claim 1, wherein at least one of the first and second positioning command is converted directly by the control unit into travel movements.

13. A computer program product stored on a non-transitory computer-readable medium within a control unit of a machine tool to issue control commands to the machine tool, and configured to receive data on an actual contour of a workpiece, wherein the computer program product is configured to perform the method as claimed in claim 1.

14. The computer program product as claimed in claim 13, wherein the computer program product comprises a digital twin of the machine tool.

15. A control unit for a machine tool, the control unit comprising:
   a computing unit; and
   a storage unit;
   wherein the control unit is configured to:
   a) provide a control command set via which a desired machining of a workpiece is defined;
   b) provide an actual contour of the workpiece;
   c) calculate a first material entrance point of a tool into the workpiece based on the actual contour of the workpiece; and d) generate a first positioning command for an approach to the first material entrance point;

wherein the first positioning command specifies a track path which differs from a track path specified by the control command set;

wherein said calculation is performed via a collision avoidance unit of the machine tool;

wherein the track path has an abbreviated traverse section and the actual contour of the workpiece is produced by detection of the workpiece;

wherein the first positioning command generated during said generation is dominant in comparison to a specification of the control command set; and wherein the method is performed in real-time.

16. A machine tool comprising at least one tool for machining a workpiece, which is moved via control commands by at least one driver; wherein the machine tool is fitted with the control unit as claimed in claim 15.

\* \* \* \* \*